Figure 3:
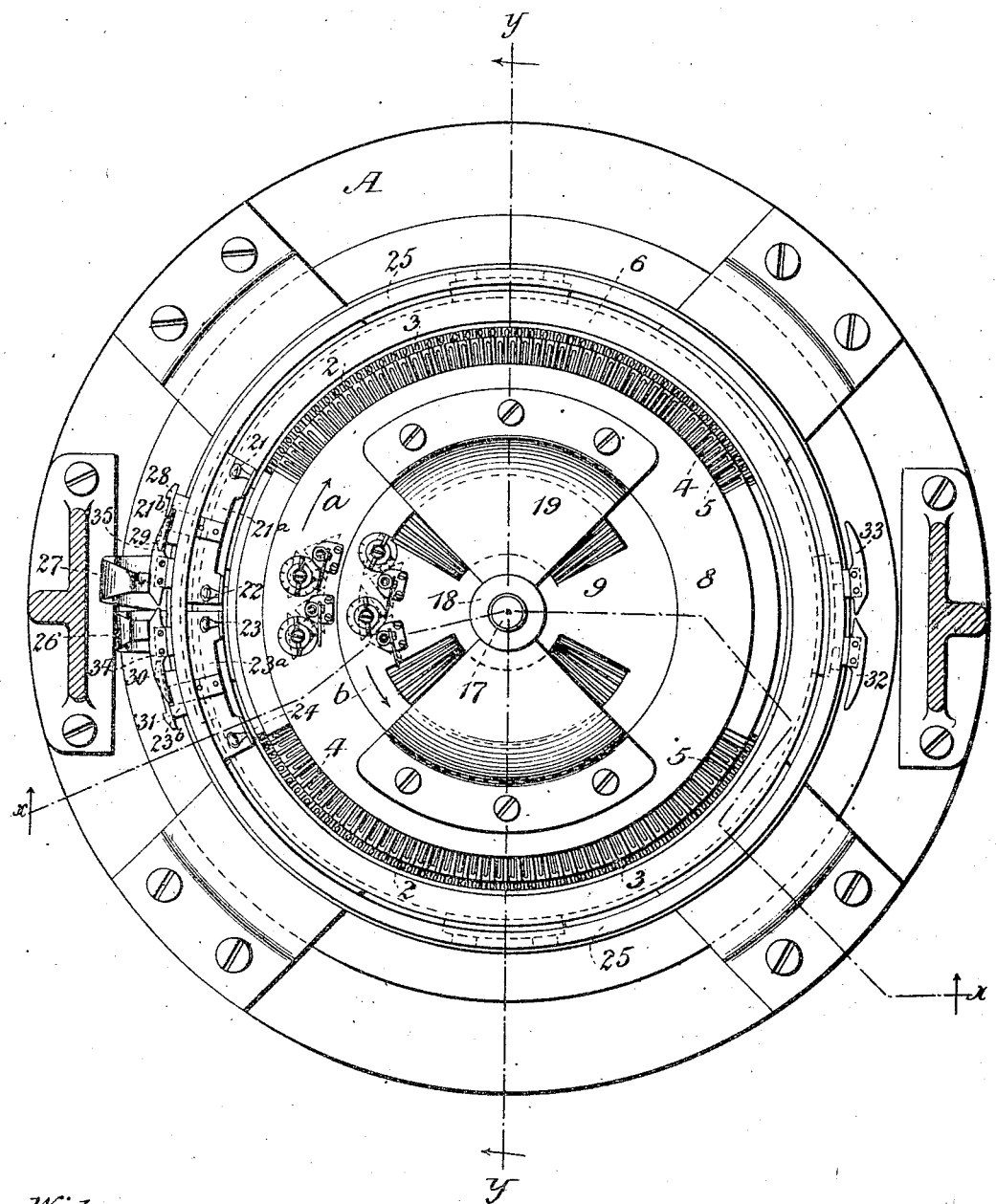

No. 868,276.
PATENTED OCT. 15, 1907.
H. A. KLEMM.
CIRCULAR KNITTING MACHINE.
APPLICATION FILED SEPT. 12, 1906.
5 SHEETS—SHEET 1.
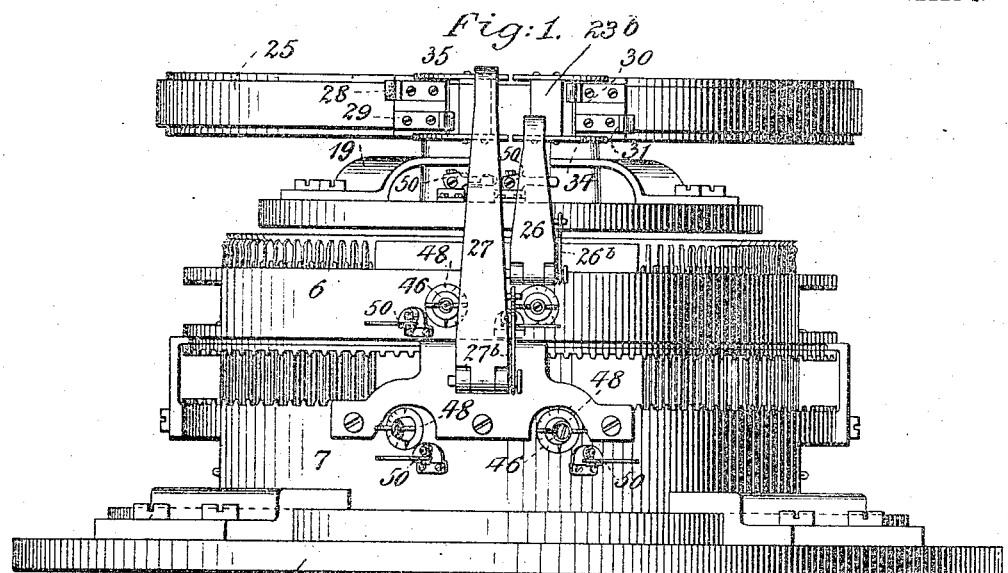
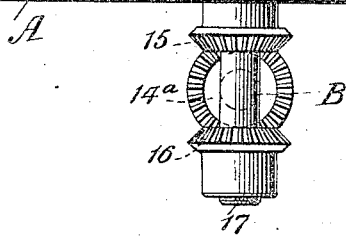
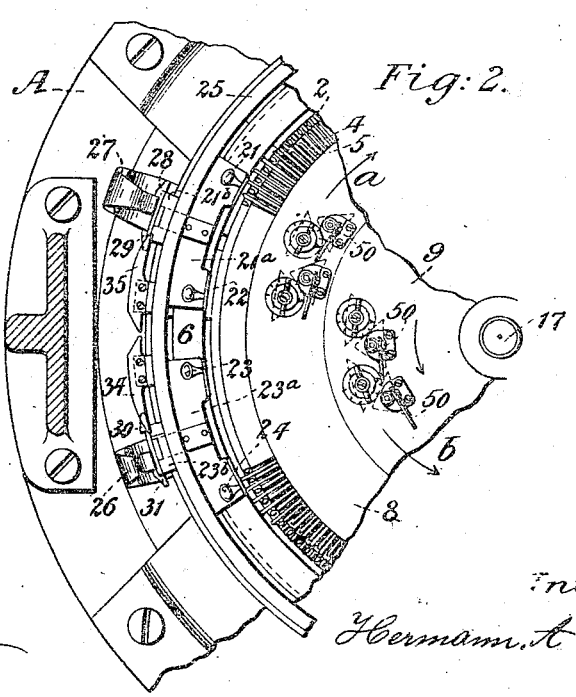
Witnesses:
Inventor:
Hermann A. Klemm No. 868,276. PATENTED OCT. 15, 1907.
H. A. KLEMM.
CIRCULAR KNITTING MACHINE.
APPLICATION FILED SEPT. 12, 1906.

5 SHEETS—SHEET 3.

Witnesses:
Inventor:
Hermann A. Klemm

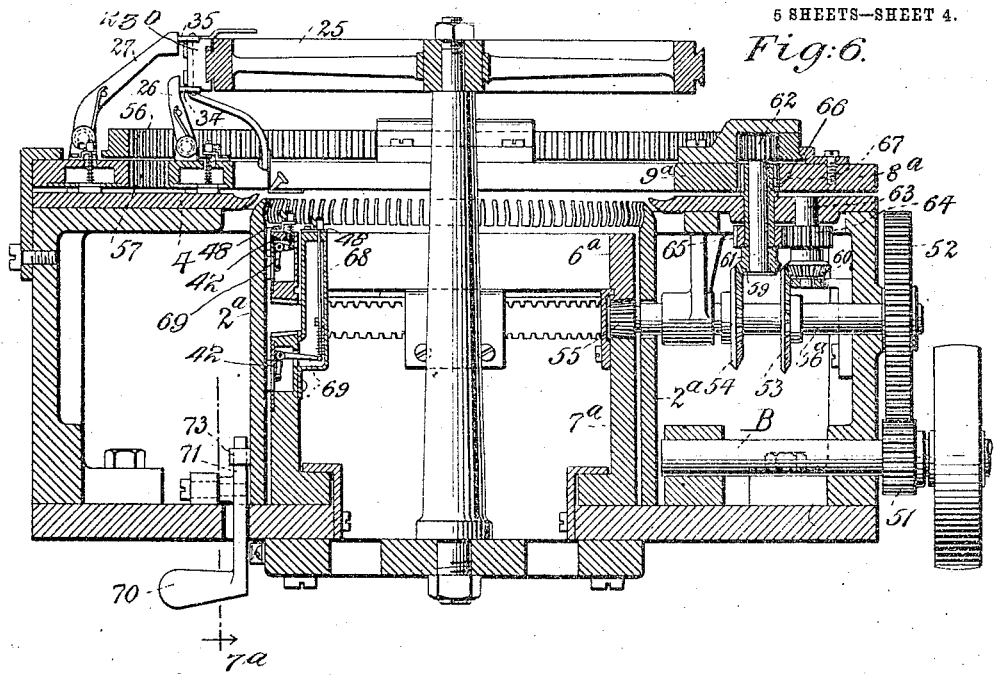
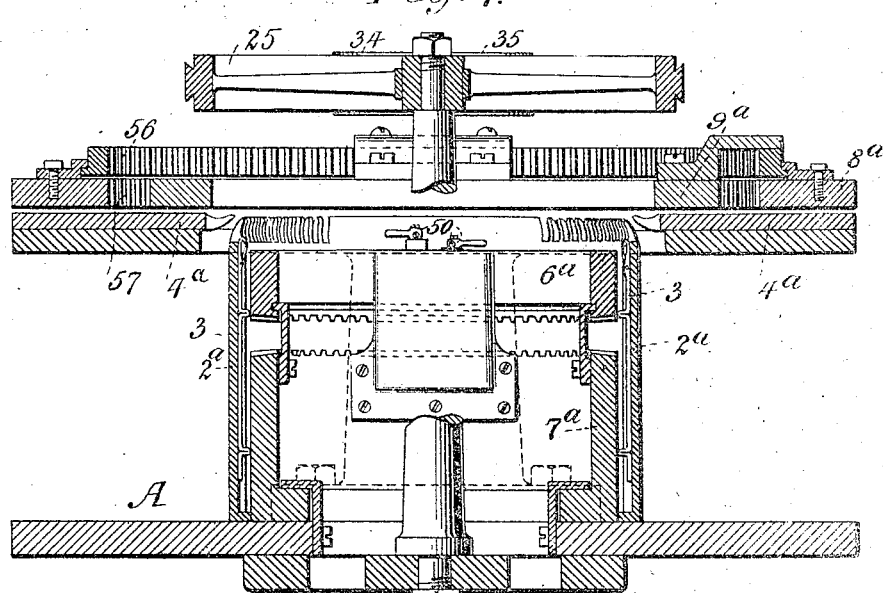
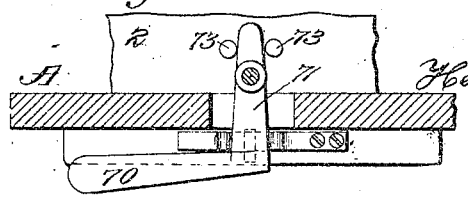

No. 868,276. PATENTED OCT. 15, 1907.
H. A. KLEMM.
CIRCULAR KNITTING MACHINE.
APPLICATION FILED SEPT. 12, 1906.

5 SHEETS—SHEET 5.

Witnesses:
J. W. Rennie
S. W. Lorenz

Inventor:
Hermann A. Klemm

UNITED STATES PATENT OFFICE.

HERMANN A. KLEMM, OF NEW YORK, N. Y., ASSIGNOR OF ONE-HALF TO JAMES D. LEYS, OF NEW YORK, N. Y.

CIRCULAR-KNITTING MACHINE.

No. 868,276.

Specification of Letters Patent.

Patented Oct. 15, 1907.

Application filed September 12, 1906. Serial No. 334,218.

*To all whom it may concern:*

Be it known that I, HERMANN A. KLEMM, a citizen of the United States, and a resident of Manhattan, in the county of New York and State of New York, have invented certain new and useful Improvements in Circular-Knitting Machines, of which the following is a specification.

The circular knitting machine forming the subject of this invention embodies such features of construction that it is adapted to produce various styles or kinds of knitting, including flat, ribbed and tubular fabrics, welts and pattern goods, by simple adjustments and arrangements of its operating devices.

The invention comprises two groups of needles arranged on opposite sides of a cylindrical bed with narrow spaces between the ends of them, and revolving cam carriers operated to rotate in opposite directions, each provided with needle actuating cams that are common to and act alternately on the two groups of needles, and are inactive only at such times as they pass by another at the spaces between the groups of needles, the width of said spaces being sufficient only for the proper passage of the cams from one group of needles to the other, thus providing for the simultaneous manufacture of two articles or pieces of knitted fabric on one machine, with the least possible loss of time due to the intervals when the cams are necessarily inactive during their rotation. It also includes a yarn carrier for each group of needles and means by which each yarn carrier is alternately moved by the cam carriers, to act, in presenting the yarns to the needles, in unison with the cams, and thereby caused to reciprocate over or in front of its respective group of needles.

The invention contemplates including in each group of diametrically opposed needles two sets of needles, one set being vertically arranged and the other set of each group preferably horizontally arranged, the cam connections with needles of the oppositely revolving cam carriers of the vertically arranged sets of needles and the cam connections with the needles of the oppositely revolving cam carriers of the horizontally arranged needles being of such a character that all the needles may be actuated to produce one kind of fabric, or the needles of some of the sets left inactive to produce other kinds of fabric. It also includes a device for racking the needles to produce pattern fabrics &c. and other features of construction all of which will now be fully described by reference had to the accompanying drawings, illustrating a practical embodiment of my invention.

Figure 4:
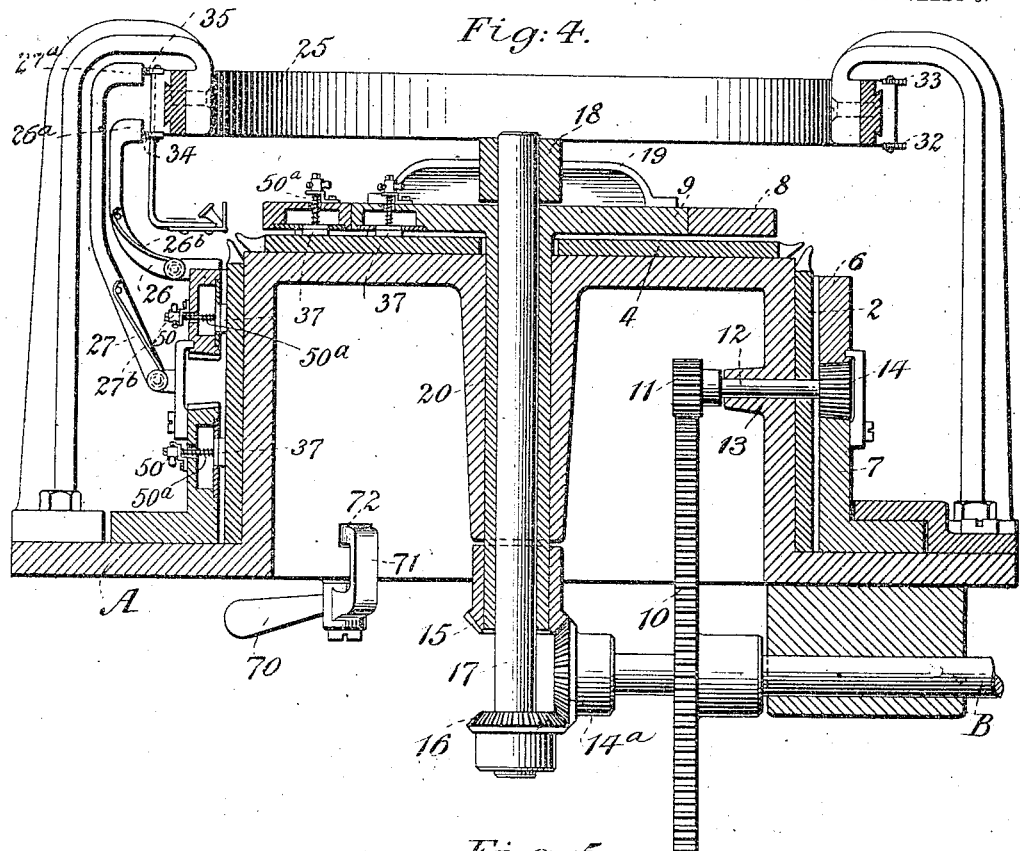
Figure 5:
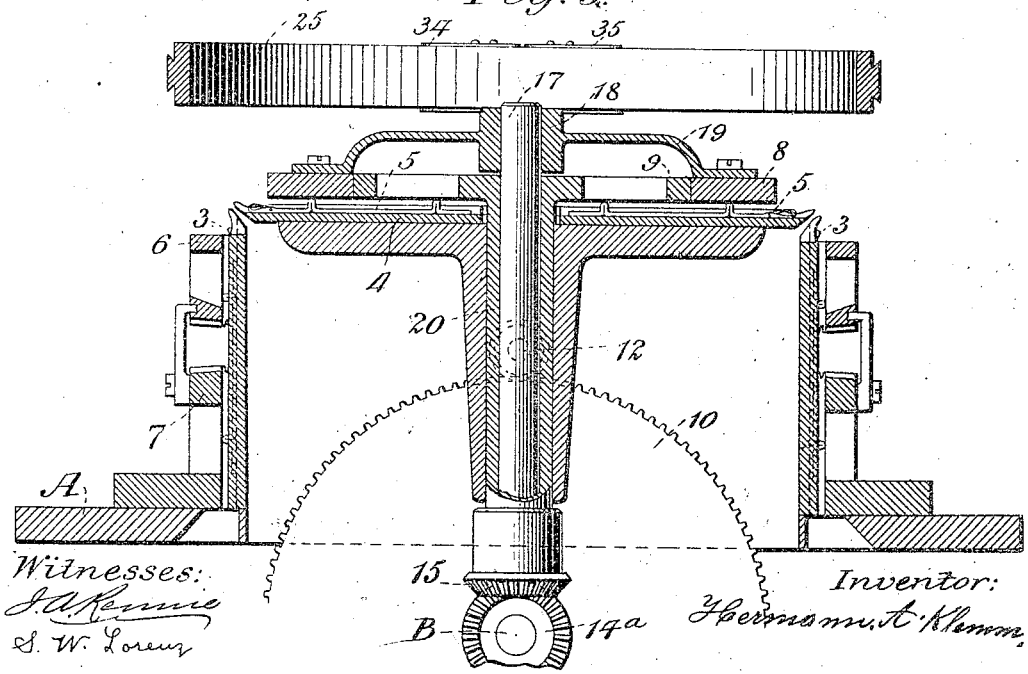
Figure 8:
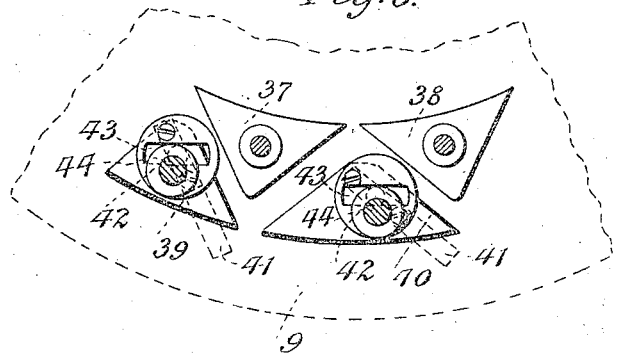
Figure 9:
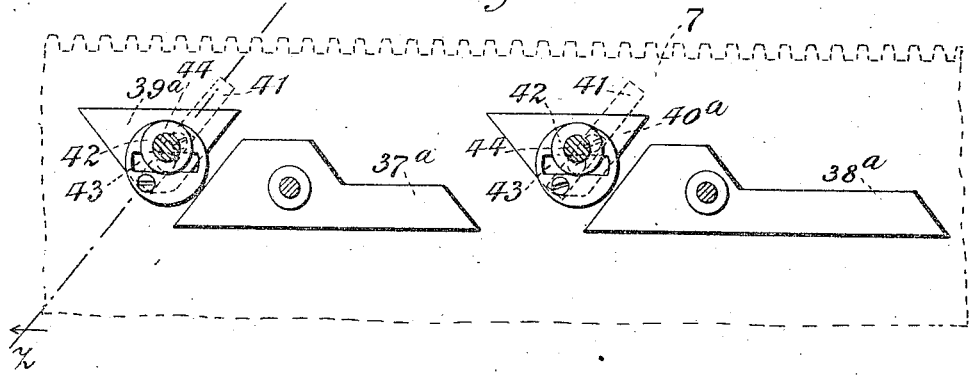
Figure 10:
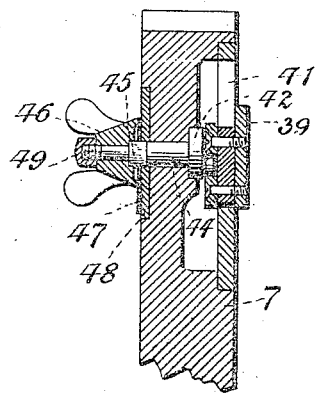

In the accompanying drawings, Figure 1 represents, in elevation, a circular knitting machine embodying my invention, the parts being therein shown as out of operation. Fig. 2 is a detail plan view, showing the parts in the position they assume at the commencement of knitting. Fig. 3, is a plan view of Fig. 1, the parts being also shown as out of operation. Fig. 4 is a sectional elevation taken on the irregular line $x\ x$ of Fig. 3, and looking in the direction of the arrows. Fig. 5 is a view similar to Fig. 4, taken on the line $y\ y$ of Fig. 3, also looking in the direction of the arrows. Figs. 6 and 7 respectively are views similar to Figs. 4 and 5 of a modified form of my invention. Fig. $7^a$ is a detail sectional view of a racking device taken on the line $7^a$ of Fig. 6. Figs. 8 and 9 are detail views of the knitting cams for actuating the needles. Fig. 10 is a detail sectional view taken on the line $z\ z$ of Fig. 9.

Similar reference characters designate corresponding parts in all the figures of the drawings.

Referring to the drawings A designates a suitable base plate for supporting the various working and other parts of the machine and 2 designates a cylindrical needle bed properly grooved to receive the needles 3.

4 designates a horizontally disposed needle disk or bed, which is provided with radial grooves to receive the needles 5, which co-act with the needles 3, in the production of rib-work. As shown in Figs. 1 to 5 inclusive these needle beds are supported on the base plate A, in proper relative position, and the cylindrical cam rings for operating the vertically disposed needles 3, and designated respectively, 6 and 7, are arranged upon the outside of the needle cylinder, and the flat cam rings for operating the horizontally disposed needles 5, and designated, respectively, 8 and 9, are arranged above the needle bed 4, in such manner as to occupy a space within the circumference of and above the needle cylinder 2. Thus as the needles are actuated by the cams, as I shall presently describe, they will be moved upwardly in the cylinder 2 and outwardly in the needle bed 4 to take yarn from the yarn guides, and the fabric will pass down within the needle cylinder 2 in the usual manner. In Figs. 6 and 7, however, I have shown the cam rings $8^a$ and $9^a$ arranged outside of and above the needle cylinder 2, and the cam rings $6^a$ and $7^a$ arranged inside the needle cylinder 2, the arrangement being such that the needles 5 will be moved inwardly by their actuating cams and the fabric will pass down over the outside of the needle cylinder $2^a$. Either one of these arrangements may be employed in the practical construction and operation of my invention.

B, designates the driving shaft which will be provided with the usual fast and loose pulleys (not shown) and with a gear wheel 10, the teeth of which mesh with the teeth of a pinion 11, the latter being mounted on a shaft 12 carried in a bearing 13, on the base plate A. To the outer end of shaft 12 is secured a bevel gear 14, adapted to engage teeth on the upper edge of the cam ring 7, and similar teeth on the lower edge of the cam ring 6, whereby, when rotation is given said pinion, the cam rings will be revolved in opposite directions.

14ª designates a miter gear mounted on the driving shaft B, the teeth of which mesh with the teeth of similar gears 15 and 16 respectively, the gear 16 being mounted on the lower end of a vertical shaft 17 which has secured to its upper end a hub 18, the latter having extensions 19 which are secured to the outer horizontally disposed ring 8, so that when rotation is imparted to the miter gears 14ª and 16, it will be obvious that the cam ring 8 will also be given rotation in the direction of the arrow $a$, Fig. 3. The shaft 17 passes up through a hollow shaft 20, which may be secured to the inner cam ring 9, or it may be made integral therewith, as may be found most desirable or convenient, and its lower end has secured to it the miter gear 15, the teeth of which, as before mentioned, mesh with the teeth of the miter gear 14ª. The hollow shaft 20 rotates within a bearing 20ª, Fig. 4, that may be secured to, or, as shown, form part of the base A, and the underside of the cam ring 9, to which the shaft 20 is secured, rests upon the horizontally-disposed needle disk or bed 4. Thus when rotation is given to the miter gear 14ª it will also impart rotation to the miter gear 15 in a direction opposite to that of the gear 16, thereby causing the inner cam ring 9 to turn in the direction of the arrow $b$ Fig. 3.

By the arrangement of gearing described, rotation of the outer horizontally disposed cam ring 8, and the upper vertically disposed cam ring 6 is effected in the same direction, and the respective knitting cams carried by these cam rings will operate upon the outer butts of the horizontal needles and the upper butts of the vertical needles; while the inner horizontally disposed cam ring 9, and the lower vertically disposed cam ring 7, operating upon the inner and lower butts of the two sets of needles, will be rotated in one direction, but in an opposite direction to the cam rings 6 and 8. One object of giving rotation to the cam rings 6, 8, in one direction and rotation to the cam rings 7, 9 in an opposite direction is for the purpose of giving a reciprocating movement to yarn guides 21, 22 and 23, 24, the two former guides being carried by a plate 21ª supported on a sliding block 21$^b$ and the two latter guides being carried by a plate 23ª, supported on a similar sliding block 23$^b$. These sliding blocks are arranged upon a circular track or guide-way 25, and are oscillated through the medium of latches 26 and 27, which are carried by any two of the cam rings which revolve in opposite directions, the latch 26 being herein shown as carried by the cam ring 6 and the latch 27 being carried by the cam ring 7; said latches being adapted to alternately engage the respective sliding blocks 21$^b$ and 23$^b$. The upwardly extending latches 26 and 27 are respectively pivotally connected to the cam rings 6 and 7; they are controlled in one direction by the springs 26$^b$ and 27$^b$, and are provided with teeth 26ª and 27ª; the said tooth 26ª being adapted to alternately engage with the lugs or teeth 31 and 29 respectively projecting from the lower parts of the sliding blocks 23$^b$ and 21$^b$, and the tooth 27ª is adapted to alternately engage with the lugs or teeth 28 and 30, which respectively project from the upper part of the sliding blocks 21$^b$ and 23$^b$.

It will be observed that the tooth 26ª of the latch 26 is located in a lower plane than the tooth 27ª of the latch 27, and that the latches themselves are so disposed that they are free to pass each other without interference during the opposite rotation of the cam rings 6 and 7. Starting from the inoperative position, Figs. 1 and 3, the tooth 26ª of the latch 26 will engage the tooth 31 of the sliding block 23$^b$ and carry said block, with its attendant yarn guides 23 and 24 a half revolution while the tooth 27ª of the latch 27, by engaging the tooth 28 of the sliding block 21$^b$, will carry said block 21$^b$ with its attendant yarn guides a half revolution in the other direction, the two blocks arriving simultaneously at the opposite side of the machine in front of tripping cams 32 and 33, secured to the circular track 25, and which act respectively on the catches 26 and 27 and cause them to release the sliding blocks, which remain stationary until again picked up by the continuously rotating latches 26 and 27. This happens when the latch 26 moves off the tripping cam 32 and the latch 27 moves off the tripping cam 33, said latch 26 then, by engaging the tooth 29, carries the sliding block 21$^b$ back to its original position and at the same time the latch 27, by engaging the tooth 30 carries the block 23$^b$ back to the starting point, when the latches 26 and 27 are moved away from the sliding blocks 21$^b$ and 23$^b$, by the tripping cams 34 and 35, also secured to the circular track, as clearly shown at Figs. 1 and 3, leaving the said blocks to be again picked up by their respective latches 26 and 27, as before described. It will thus be seen that as the cam rings 6 and 7 rotate continuously in opposite directions each yarn guide is reciprocated over its respective group of needles, operating in conjunction with the needle cams carried by the rings 6 and 7, in a manner well understood. These pairs of tripping cams 32, 33 and 34, 35 are diametrically secured to the circular track 25 and are located over the spaces between the two groups of needles. Thus with a single needle cam on each of the cam rings 6, 7, 8 and 9, I am enabled to knit four courses during one rotation of the cam rings, while with double cams on each cam ring I am enabled to knit eight courses in one rotation, as I shall presently describe.

In Figs. 1, 3, 4 and 6 the teeth 26ª, 27ª are at rest upon the respective trips 34 and 35, being thus thrown out of engagement with the teeth on the sliding blocks 21$^b$, 23$^b$ but during the operation of knitting the latches will move away from each other, riding down the inclined face of the tripping cams until they are forced into engagement, the one with the tooth 28 on the sliding block 21$^b$, and the other with the tooth 31 on the sliding block 23$^b$, this being accomplished through the medium of the springs 26$^b$ and 27$^b$ which are connected to the latches 26, 27 in such manner as to give them a tendency to normally move inwardly. The plates 21ª and 23ª which, as previously mentioned, carry the yarn guides 21, 22, 23, and 24, are preferably bent at right angles in the form of an angle-iron, the vertical portions of which serve the purpose of keeping the latches off the vertically disposed needles down as they are thrust upwardly by the lifting cams in the cam rings 6 and 7, while the horizontal portions serve the same purpose with respect to the horizontally disposed needles, as they are actuated by the cams in the cam rings 8 and 9.

I will now describe the knitting cams, having especial reference to Figs. 8, 9 and 10, and as the cams are all substantially alike I shall confine my description to one set, premising, however, that any of the well-known constructions and arrangements of cams may be employed without affecting the operation or general efficiency of my invention. 37, 38, designate respectively the lifting cams of the inner horizontally disposed cam ring 9, and 37$^a$, 38$^a$ the lifting cams of the lower vertically disposed cam ring 7, which are adapted respectively to engage the inner butts of the needles 5 and lower butts of the co-acting needles 3, so as to bring them into position to receive yarn from the proper yarn guides; 39, 39$^a$ and 40 40$^a$ designate respectively the drawing down cams, the latter being arranged to move upwardly and downwardly for the purpose of shortening and lengthening the stitches. As here shown, the drawing down cams are each guided in a slot 41, located in the cam rings and arranged parallel with the slope or incline of their drawing down edges. Adjustment of each of these cams is effected through the medium of an eccentric or similar device 42, adapted to work in an opening 43, located in the cam ring at the under side of the cams, the arrangement being such that when the eccentric 42, is turned in one direction, the cam will be moved upwardly, and when turned in an opposite direction the cam will be moved downwardly, thus determining the length of stitch. The eccentric is here shown as mounted on or forming part of a stem or pintle 44, which projects out through the cam ring where it is flattened at the point 45, to receive thereon a thumb screw 46, and a finger 47, the latter being adapted to register with graduations arranged on a dial 48 secured to the cam ring. The thumb screw is secured to the stem or pintle 44, by means of an internally threaded screw adapted to fit the reduced threaded extremity 49 of the stem or pintle. Thus by manipulating the thumb screw it will be apparent that the finger 47, will be brought into register with the graduations on the dial, 48 and the proper depression or elevation of the drawing down cams determined to provide for the desired stitch. This construction is common to many of the straight-frame knitting machines, and need not be further described. The lifting up cams 37, 37$^a$ and 38 38$^a$ are also arranged so as to be moved out of the path of the butts of the needles, and any of the well known means for accomplishing this may be employed. As herein illustrated, however, I have shown them as provided each with a stem or pintle which projects out through the cam rings where they are provided with an eccentric or cam 50, Fig. 1 whereby they are moved. Interposed between the eccentrics 50 and cams are springs 50$^a$, which tend to keep said cams normally in the path of the needle butts.

Referring now to Figs. 6 and 7, it will be noted that the cam rings 8$^a$ and 9$^a$, and the needle bed 4$^a$, are arranged outside the needle cylinder 2$^c$, and that the cam rings 6$^a$ and 7$^a$ are located within the needle cylinder 2$^a$, by which arrangement the needles 5, will be thrust inwardly instead of outwardly, as previously described with respect to Figs. 1 to 5 inclusive, and the fabric will pass on the outside of the needle cylinder 2$^a$. A bevel gear 55 on end of shaft 56$^a$ turns the cam rings 6$^a$ and 7$^a$ in opposite directions, and bevel gears 53, 54, also on said shaft, impart motion to the cam rings 8$^a$ and 9$^a$ in opposite directions through trains of gears interposed between them and internal teeth 56 and 57 on the cam rings 8$^a$ and 9$^a$. Comprised in the train of gears referred to are the bevel gears 59, 60. The bevel gear 59 meshes with the teeth of the bevel gear 54, and is mounted on a shaft 61, which has at its upper end a pinion 62, which meshes with the internal teeth 56 of the cam ring 9$^a$. The bevel gear 60, meshes with the teeth of the bevel gear 53, and is mounted on a suitably supported short shaft 63, which also carries a pinion 64, and the latter drives a similar pinion 65, secured to a hollow shaft 66. The upper end of this hollow shaft is provided with teeth 67 which mesh with the internal teeth 57, of, and give rotation to, the cam ring 8$^a$ in an opposite direction to the cam ring 9$^a$. Thus it will be seen that the vertically disposed cam ring 6$^a$ and the horizontally disposed cam ring 9$^a$ revolve in the same direction, while the vertically disposed cam ring 7$^a$, and the horizontally disposed cam ring 8$^a$ revolve in the same direction, but in an opposite direction to the cam rings 6$^a$ and 9$^a$.

It will be noted by reference to Fig. 6 that the latches 26 and 27 are pivotally supported, one to each of the horizontally-disposed cam rings 8$^a$, 9$^a$ and they are brought into engagement with the yarn guide blocks 21$^b$ and 23$^b$ in a manner similar to that described with reference to Figs. 1 to 5, inclusive, and need not be further described. In order to provide for the ready manipulation of the needle operating cams which, in this construction, are precisely similar to those previously described, I mount one set of eccentrics 42, and dials 48, on the upper edge of the cam ring 6$^a$, and another set of similar eccentrics and dials on the upper end of an appropriate housing secured to the cam ring 7$^a$, and provide in each instance suitable link and lever connections 68, 69, by which the needle lifting up cams may be thrown outward to engage the needle butts, or be drawn inward so as not to engage them.

In order to provide for the usual racking of the needles I may use means for moving either the horizontal or the vertical needles, but in the present instance I have illustrated in the drawings, a device which is designed to move the vertical needles and may be operated by hand. As herein shown the racking device comprises a lever 70, pivotally supported to the frame or base A, and which has an upturned extension 71, which may either enter a slot 72, in the needle cylinder 2, as shown in Fig. 4, or pass between studs or projections 73, on the needle bed 2, as shown in Figs. 6 and 7$^a$. Thus as the lever 70 is moved in one direction or the other it will be apparent that the needle cylinder 2, will also be moved and the racking thereby accomplished.

In order that the advantages of my invention may be the better understood, I will describe its operation during the process of knitting the different kinds of fabrics. The needles 3 and 5 are arranged throughout a portion of the circumference of the needle beds 2 and 4 as shown, and preferably at diametrically opposite points leaving a convenient space between them for the knitting cams as they pass each other in moving from one group of needles to the other group. All of the knitting cams are employed in the production of full fashioned ribbed fabrics, the yarn guides being reciprocated as previously mentioned and produce two articles at a time. When it is desired to knit flat selvaged fabric, however, either the horizontally disposed needles 5, or the vertically disposed needles alone are used, in which event the cams for the other set of needles are moved out of operative position. In knitting tubular fabrics both the horizontally and vertically disposed needles will be employed in order that one course, or half of a tube, may be made on one set of each group of needles, and the other course, or remaining half of the tube, may be made on the other set of each group of needles. In other words one-half of a tubular article is knitted on a set of horizontally disposed needles, and the other half on the coacting set of vertically-disposed needles. In this operation it is only necessary to use two cam rings, a horizontal and a vertical one, which revolve in opposite directions, it is obvious that any two may be employed as may be found most desirable or convenient—it being understood, of course, that those cams on such cam rings which are not essential to the production of this class of fabric will be thrown entirely out of the path of the needles.

In the constructions and arrangements of my invention herein shown and described, I am enabled to accomplish with the use of two drawing-down cams that which has heretofore been found impossible to accomplish in straight frame knitting machines with less than four such cams, as it will be apparent to those skilled in the art that by reason of the constantly rotating movement of the cam rings 6, 7 and 8, 9 in opposite directions, the cams carried therein will each knit the courses while always moving in the same direction of rotation, therefore all strain upon the previously knitted courses due ordinarily to reversal of movement of the cams will be eliminated, which strain has been heretofore encountered in straight frame knitters, due to the necessity of having to reciprocate the knitting cams.

It will be observed that a maximum amount of fabric, that can be knitted by a machine of this character, will be produced for the extent of travel of the needle actuating cams, as the intervals of time during their passage through the spaces between the groups of needles is a minimum, said spaces being very much less than the parts of the circumference of the cylinder occupied by the needles. It will also be observed that when two tubular fabrics are made on the machine the total of the width of fabric produced exceeds the perimeter of the cylinder; a feature, as far as I am aware, unique to this machine.

In the construction illustrated in the drawings latch needles are shown, but obviously the invention is not limited to their use.

I claim:

1. A circular knitting machine comprising two groups of needles oppositely arranged with circumferential spaces between their adjacent ends; rotary cam carriers having needle operating cams common to the needles of each group; means for rotating said carriers in opposite directions, whereby their respective cams alternately actuate needles of each group; and yarn carriers reciprocating respectively in one arc to deliver yarn to one group of needles, and in another arc to deliver yarn to the other group of needles.

2. A circular knitting machine comprising two groups of needles oppositely arranged with circumferential spaces between their adjacent ends; rotary cam carriers having needle operating cams common to the needles of each group; said cams moving during their entire rotation through the same circular paths; means for rotating said carriers in opposite directions, whereby their respective cams alternately actuate needles of each group; and yarn carriers reciprocating respectively in one arc to deliver yarn to one group of needles, and in another arc to deliver yarn to the other group of needles.

3. A circular knitting machine comprising two groups of needles oppositely arranged with circumferential spaces between their adjacent ends, each group comprising two sets of needles; rotary cam carriers having needle operating cams common to the needles of each of the sets of needles of each group; and means for rotating said carriers of the sets of corresponding needles in opposite directions, whereby their respective cams alternately actuate needles of corresponding sets of each group.

4. A circular knitting machine comprising two groups of needles oppositely arranged with circumferential spaces between their adjacent ends, each group comprising two sets of needles; rotary cam carriers having needle operating cams common to the needles of each of the sets of needles of each group said cams moving during their entire rotation through the same circular paths; and means for rotating said carriers of the sets of corresponding needles in opposite directions, whereby their respective cams alternately actuate needles of corresponding sets of each group.

5. A circular knitting machine comprising two groups of needles oppositely arranged with circumferential spaces between their adjacent ends; each having two sets of needles rotary cam carriers having needle operating cams common to the needles of each group; and means for rotating said carriers in opposite directions, whereby their respective cams alternately actuate needles of each group; and means for shifting the needle bed for causing racking effects of the needles.

6. A circular knitting machine comprising two groups of needles oppositely arranged with circumferential spaces between their adjacent ends; oppositely moved rotary cam carriers having needle operating cams common to the needles of each group; a yarn carrier for each of the groups of needles fitted on a circular slide way and located, when at rest, over one of the spaces between the groups of needles; means for connecting the yarn carriers alternately with the oppositely moving cam carriers, to cause each yarn carrier to be reciprocated over its respective group of needles; and means for rotating said carriers in opposite directions, whereby their respective cams alternately actuate needles of each group.

7. A circular knitting machine comprising two groups of needles oppositely arranged oppositely moved rotary cam carriers having needle operating cams common to the needles of each group, said cams moving during their entire rotation through the same circular paths; a yarn carrier for each of the group of needles fitted on a circular slide way and located, when at rest, over one of the spaces between the groups of needles; means for connecting the yarn carriers alternately with the oppositely moving cam carriers, to cause each yarn carrier to be reciprocated over its respective group of needles; and means for rotating said carriers in opposite directions, whereby their respective cams alternately actuate needles of each group.

8. A circular knitting machine comprising two groups of needles oppositely arranged with spaces between their adjacent ends, each group comprising two sets of needles; oppositely moved rotary cam carriers having needle operating cams common to the needles of each of the sets of needles of each group; yarn carriers for each of the groups of needles fitted on a circular slide way and located, when at rest, over one of the spaces between the groups of needles; means for connecting the yarn carriers alternately with the oppositely moving cam carriers, to cause the yarn carriers to be reciprocated over their respective groups of needles; and means for rotating said carriers of the sets of corresponding needles in opposite directions, whereby their respective cams alternately actuate needles of corresponding sets of each group.

9. In a circular knitting machine, the combination of two groups of needles oppositely arranged with circumferential space between their adjacent ends, each group consisting of a vertical set of needles and a horizontal set of needles; a pair of rotary cam carriers for the vertical needles and a pair of rotary cam carriers for the horizontal needles, the cam carriers of each pair being adapted to rotate in the opposite direction; an operating cam on each of the cam carriers common to the two sets of similarly arranged needles upon which they act; and means for rotating the cam carriers of each of the pairs in opposite directions, whereby their respective cams actuate alternately the needles of each group.

10. In a circular knitting machine, the combination of two groups of needles oppositely arranged with circumferential spaces between their adjacent ends, each group consisting of a vertical set of needles and a horizontal set of needles; a pair of rotary cam carriers for the vertical needles and a pair of rotary cam carriers for the horizontal needles, the cam carriers of each pair being adapted to rotate in opposite directions and, respectively during their entire rotation through the same circular paths; and operating cams on each of the cam carriers common to the two sets of needles upon which they act; and means for rotating the cam carriers of each of the pairs, in opposite directions, whereby their respective cams actuate alternately the needles of each group.

Signed at New York city in the county of New York and State of New York this 11" day of September A. D. 1906.

HERMANN A. KLEMM.

Witnesses:
H. R. BAUER,
J. C. CONRADI.